US007435485B2

(12) United States Patent
Ng et al.

(10) Patent No.: US 7,435,485 B2
(45) Date of Patent: Oct. 14, 2008

(54) MAGNETIC MATERIAL, AND A MEMS DEVICE USING THE MAGNETIC MATERIAL

(75) Inventors: Wei Beng Ng, Singapore (SG); Akio Takada, Miyagi-ken (JP)

(73) Assignee: Sony Corporation, Tokyo (JP)

( * ) Notice: Subject to any disclaimer, the term of this patent is extended or adjusted under 35 U.S.C. 154(b) by 249 days.

(21) Appl. No.: 11/168,698

(22) Filed: Jun. 27, 2005

(65) Prior Publication Data

US 2007/0007496 A1 Jan. 11, 2007

(30) Foreign Application Priority Data

Jun. 29, 2004 (SG) ................................ 200403719

(51) Int. Cl.
*B32B 15/00* (2006.01)

(52) U.S. Cl. ................. 428/692.1; 428/832.1; 420/835; 148/425; 148/313

(58) Field of Classification Search ................. 428/692, 428/832.1; 148/313, 425; 420/835
See application file for complete search history.

(56) References Cited

U.S. PATENT DOCUMENTS 4,935,314 A * 6/1990 Kobayashi et al. .......... 428/812
4,950,340 A * 8/1990 Wakita et al. ............... 148/402
5,031,055 A * 7/1991 Yanagisawa ............. 360/294.7
5,290,629 A * 3/1994 Kobayashi et al. .......... 428/812
5,302,464 A * 4/1994 Nomura et al. ............. 428/551
5,645,684 A * 7/1997 Keller ....................... 148/33.2
6,335,103 B1 * 1/2002 Suzuki et al. ............... 428/611
6,522,801 B1 * 2/2003 Aksyuk et al. ................ 385/18
6,627,253 B2 * 9/2003 Suzuki et al. ............... 427/129
6,642,539 B2 * 11/2003 Ramesh et al. ................ 257/43
6,881,437 B2 * 4/2005 Ivanov et al. ............... 438/676
7,057,251 B2 * 6/2006 Reid .......................... 257/432
7,075,160 B2 * 7/2006 Partridge et al. ............ 257/414
7,141,318 B1 * 11/2006 Choe et al. ............... 428/832.2
2003/0036215 A1 * 2/2003 Reid .......................... 438/52
2003/0062553 A1 * 4/2003 Ramesh et al. .............. 257/295
2003/0184921 A1 * 10/2003 Sugita et al. ............. 360/324.1
2007/0007496 A1 * 1/2007 Ng et al. ..................... 252/500

FOREIGN PATENT DOCUMENTS

JP 60228637 A * 11/1985

OTHER PUBLICATIONS

JP2073511—Magnetic Recording Medium.
JP5143953—Magnetic Recording Medium.
JP56156931—Magnetic Recording Medium.

* cited by examiner

*Primary Examiner*—Holly Rickman
*Assistant Examiner*—Gary Harris
(74) *Attorney, Agent, or Firm*—Frommer Lawrence & Haug LLP; William S. Frommer; Thomas F. Presson

(57) ABSTRACT

A magnetic material comprises 50-80 wt % of Cobalt, 9-15 wt% of Nickel, 10-25 wt% of Rhenium, 0.1 to 2.0 wt% of Phosphorus, and 5-10 wt % of Tungsten or Platinum. It can be formed as a layer having good vertical magnetic properties (e.g. when magnetised it can provide a high magnetic field strength in the direction perpendicular to the plane of the layer). The layer preferably has a thickness of above 1 μm. It can be formed by electroplating. The layer is useful for inclusion in a MEMS device.

5 Claims, 7 Drawing Sheets

Side View

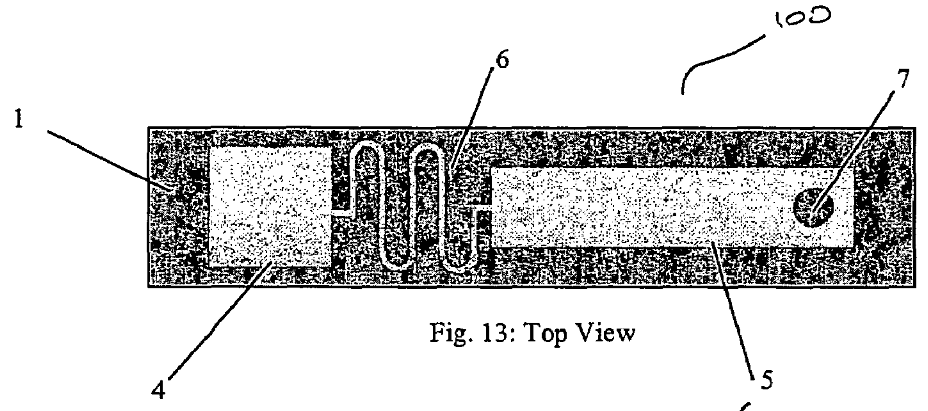
Fig. 13: Top View
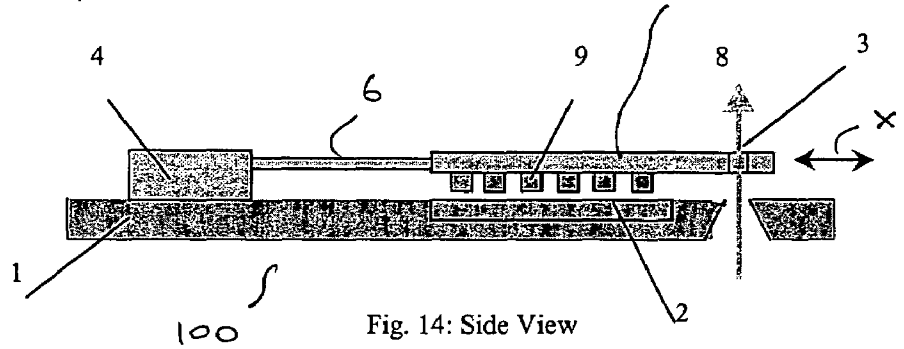
Fig. 14: Side View
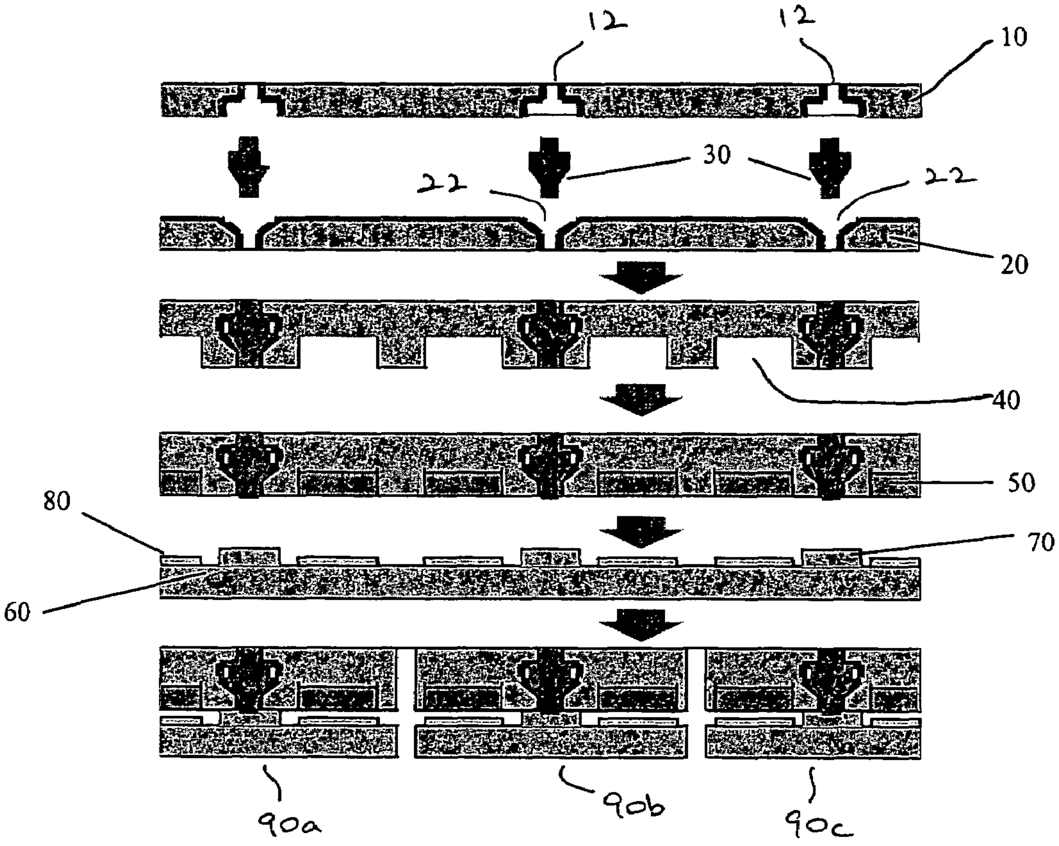
Fig. 15

MAGNETIC MATERIAL, AND A MEMS DEVICE USING THE MAGNETIC MATERIAL

FIELD OF THE INVENTION

The present invention relates to a magnetic material, and to MEMS (micro electromechanical) devices which employ the magnetic material.

BACKGROUND OF INVENTION

As modern technology advances, many electronic components and devices have been scaled down to the micro regime aiming for faster and more portable operation. This has given rise to the emergence of micro-electromechanical systems (MEMS) technology that made use of semiconductor manufacturing technology for the fabrication of micro- and nano-devices. In line with the trend of development, there is a need to develop cost-effective processes that can be integrated easily in batch processing. Many modern magnetic MEMS devices (such as including micro-actuators, sensors, and frictionless micro-gears) require a magnetic film which can produce a high vertical magnetic field.

It is known to use electroplating to deposit various thin magnetic films for magnetic recording purposes. In contrast to many other thin-film deposition methods such as sputtering and evaporation, electroplating offers a much faster and cost-effective method of depositing thick (~100 um) films with easy control of process parameters for achieving specific film characteristics. In line with the rising demand for microdevices, electroplating has been actively explored in recent years as a favorable method for deposition of high aspect ratio microstructures in the fabrication of MEMS devices [1-3] since it is compatible with many other microfabrication processes.

Cobalt-based alloys with the addition of Ni, P, As, Sb, Bi, W, Cr, Mo, Pt or Cu have been electroplated as either binary or ternary material systems [4-8]. However, there are not many studies on the vertical anisotropy of material systems fabricated by electroplating. So far, material systems such as CoNiP [9], CoMnP [10], CoNiMnP [10], CoPtWP [11] and CoPt [12,13] has been an attractive candidate under development as a hard magnetic material with high vertical magnetic anisotropy. Nevertheless, these reports have been limited to magnetic film thickness of a few microns (<10 um) which might not meet the requirement of many magnetic MEMS devices. In order to generate sufficient forces for microactuation purposes, substantial material volume is necessary hence the requirement for thick films. Although electroplated CoNiMnP in the form of thick array (40 um height) [14] has been reported to exhibit high vertical anisotropy by virtue of their magnetic array geometry, material systems of much higher intrinsic properties should be utilized so as to maximize the performance of devices.

In view of the above considerations, there is a need to develop new material of sufficient vertical magnetic property by a suitable process that is capable of thick film deposition.

SUMMARY OF THE INVENTION

The present invention aims to provide a new and useful magnetic material which may be formed by electroplating.

It further aims to provide micro-devices which employ the magnetic material. Examples of micro-devices include micro-actuators, sensors, frictionless micro-gears etc.

The invention proposes that a magnetic material comprises 50-80 wt % of Cobalt (Co), 9-15 wt % of Nickel (Ni), 10-25 wt % of Rhenium (Re), 0.1 to 2.0 wt % of Phosphorus (P), and 5-10 wt % of Tungsten (W) or Platinum (Pt). The magnetic material may be formed as a layer, and it has been found that such compositions may have good vertical magnetic properties (e.g. when magnetised can provide a high magnetic field strength in the direction perpendicular to the plane of the layer). The layer preferably has a thickness of above 1 μm (and typically more than about 50 μm, though normally less than 200 μm).

In a method according to the invention, the layer of magnetic material is formed by electroplating, for example onto a microstructure suitable for fabrication of magnetic micro-devices such as actuators.

The proposed magnetic material based on Co—Ni—Re—P—W or Co—Ni—Re—P—Pt is an attractive candidate for many integrated micro-devices, since it would provide potentially high vertical magnetic performance and ease of property control by process parameters. Such devices are proposed in other expressions of the invention.

BRIEF DESCRIPTION OF THE DRAWINGS

Preferred features of the invention will now be described, for the sake of illustration only, with reference to the following figures in which:

FIG. 13 is a schematic diagram of the top view of a microshutter which is an embodiment of the present invention;

FIG. 14 is a schematic diagram of the side view of a microshutter which is an embodiment of the present invention; and FIG. 15 is a schematic diagram of a micromotor which is an embodiment of the present invention.

DETAILED DESCRIPTION OF THE EMBODIMENTS

The present inventors have performed the following experiments in which layers of magnetic materials (some being embodiments of the invention) were produced by electroplating and tested.

Firstly, circular glass substrates (12 mm diameter) were sputtered with a seed layer of either Cr(20 nm)/Au(200 nm) or Cr(20 nm)/Cu(200 nm) before electro-deposition using a rotating disk electroplating system. The sputtered Au or Cu layer was found to have (111) crystal orientation that is beneficial for the enhancement of vertical magnetic properties of a film to be subsequently deposited. The sputtered substrates were ultrasonically cleaned using trichloroethylene and ethanol. A conducting silver paste was applied onto the back-side and side-wall of the glass substrates at two opposite points so that an electrode of the electroplating system is connected electrically to the copper seed layer on the substrates. Before plating, the surface of copper seed layer was activated using sulphuric acid. The substrates were fixed to a cathode of a known electroplating system via a holder covering the rim of substrates. Platinum wire was used as the anode for the electroplating system. An Ag/AgCl reference electrode was used as the reference electrode which was connected to the plating solution via a salt bridge. The exposed area for plating was over a central circular area of 10 mm diameter. Electrochemical deposition was carried out at room temperature (about 20° C.) by an electrical circuit which applies a suitable current density (in the range of 10 to 30 $mA/cm^2$)between the anode and cathode via a galvanostat (a device which provides a constant current).

For different ones of the substrates, different electroplating bath compositions were selected, in the range of compositions given in Table 1. CoNiReP represents a material system consisting of Co, Ni, Re and P while CoNiReP/Mn, CoNiReP/Mo, CoNiReP/W and CoNiReP/Pt denote CoNiReP doped with Mn, Mo, W and Pt respectively. The pH of each bath solutions was adjusted using sulphuric acid and sodium hydroxide to the range of 2.0 to 5.0 before plating. For good uniformity and reproducibility, electro-deposition was carried out under agitation at a rotation speed of 500 rpm.

Subsequently, the magnetic performance of the films produced was assessed by a vibrating sample magnetometry (VSM). It was found that the film composition was very much dependent on process parameters, such as concentration of the bath solutions, and plating conditions such as pH and current density. As a result, the magnetic properties of film, which are very dependent on film composition, were very sensitive to the above parameters. In this study, the interdependency between magnetic properties and process parameters for the Co—Ni—Re—P material system is investigated.

Figure 1:
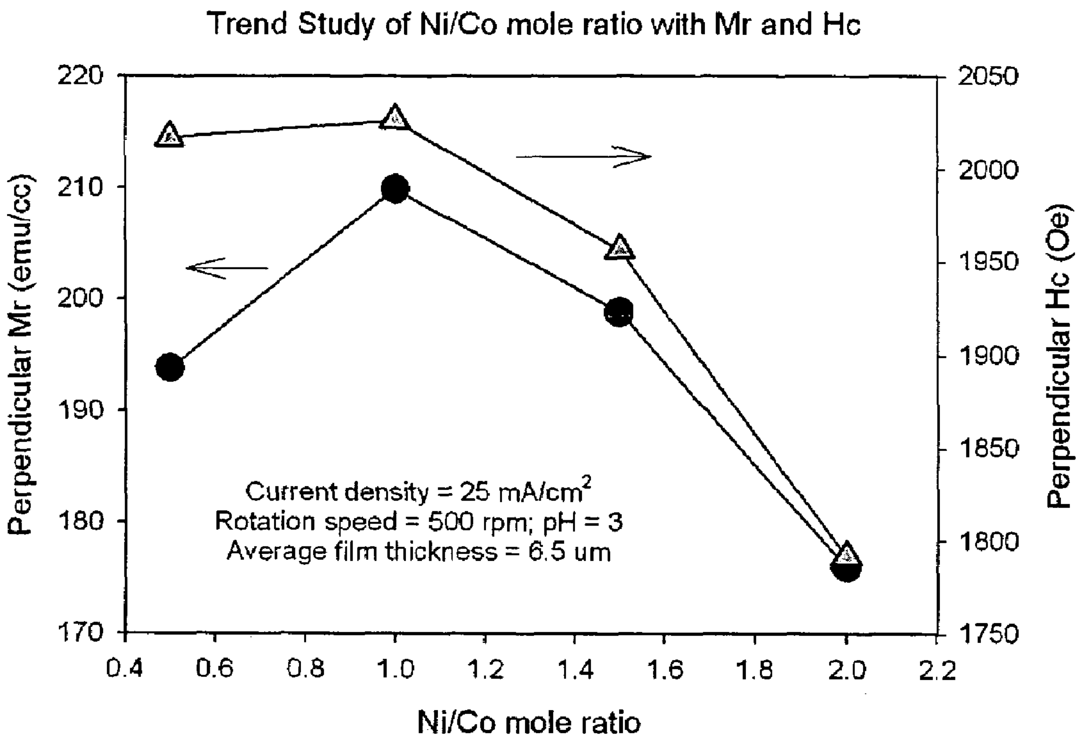
FIG. 1 is a graph showing the effect of Ni—Co mole ratio on the vertical magnetic properties of a film.

Being a multi-component system, it is important to elucidate the effect of bath composition and concentration on the deposited film. By separately studying the effect of each individual component on the performance of the film, an optimized plating bath solution can be known. FIG. 1 is a graph showing the effect of Ni—Co mole ratio of the plating bath on the vertical remnant magnetization Mr (indicated by the circles and the left-hand scale) and vertical coercivity Hc (indicated by the triangles and the right-hand scale) of film. As can be seen from the graph, an optimum performance of film is achieved at about 1.0 Ni/Co mole ratio in the bath solution. A higher Ni/Co mole ratio leads to a drastic decrease in vertical magnetic performance of films.

Figure 2:
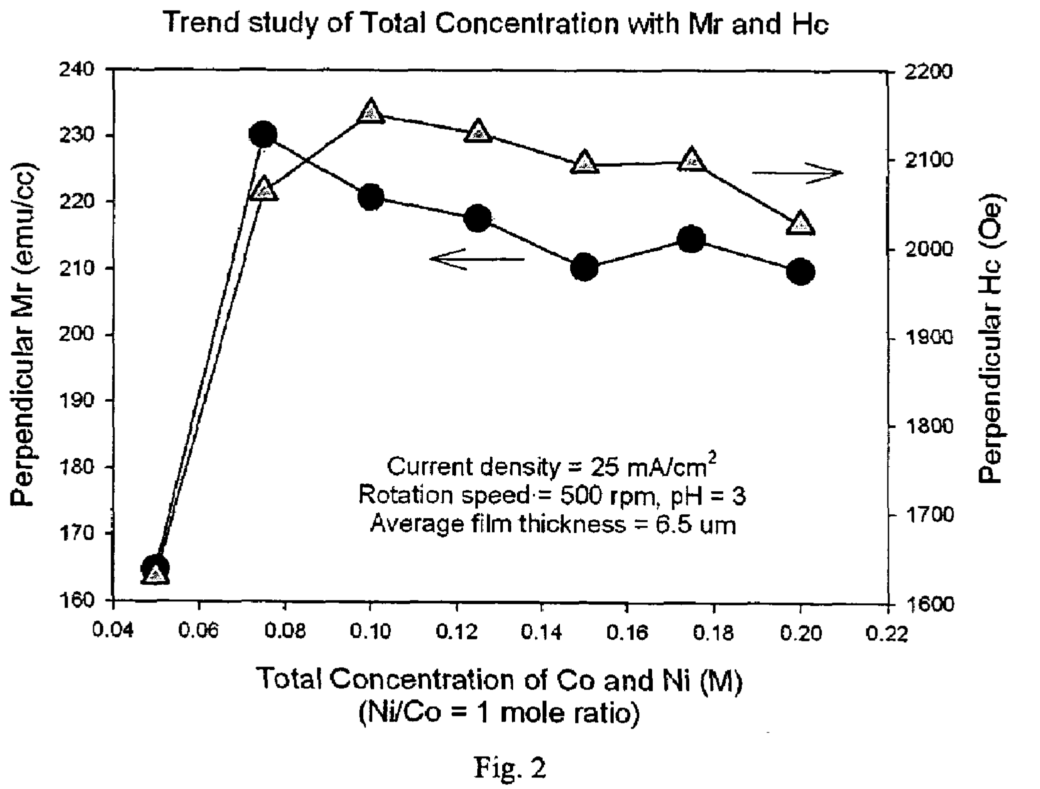
FIG. 2 is a graph showing the effect of total concentration of Co and Ni on the vertical magnetic properties of a film.

With the Ni/Co mole ratio kept at 1.0, total concentration of Ni and Co ions is then varied to study their effect on the performance of film as shown in FIG. 2. Magnetic performance is low for films plated from dilute solution with 0.05M total concentration of Co and Ni. Performance of films shows a marked improvement and remains rather constant when total Co and Ni concentration is raised beyond 0.08M, though the best vertical Hc is achieved at 0.1M.

Figure 3:
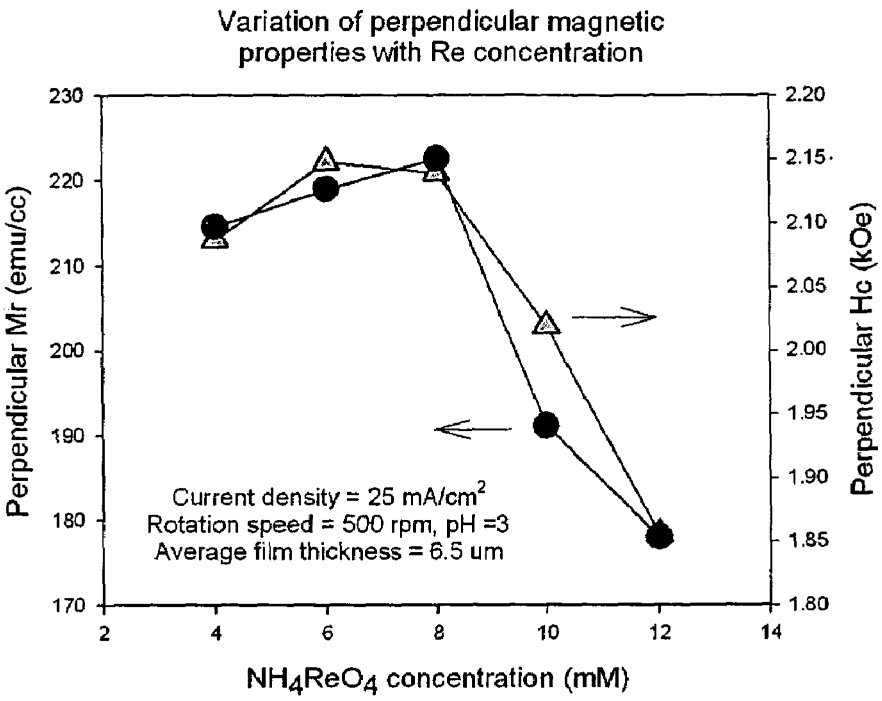
FIG. 3 is a graph showing the effect of Re concentration on the vertical magnetic properties of a film.

FIG. 3 shows the trend of film performance in relation to Re concentration with total concentration of Co and Ni maintained at 0.1M and with Ni/Co mole ratio at 1.0. There is an optimum concentration of about 0.008M at which the appropriate presence of Re maximizes the vertical magnetic properties of film. An excessive amount of Re in the bath solution leads to a decrease in both vertical Mr and Hc while a low concentration of Re produces film of high residual stress leading to peeling.

Figure 4:
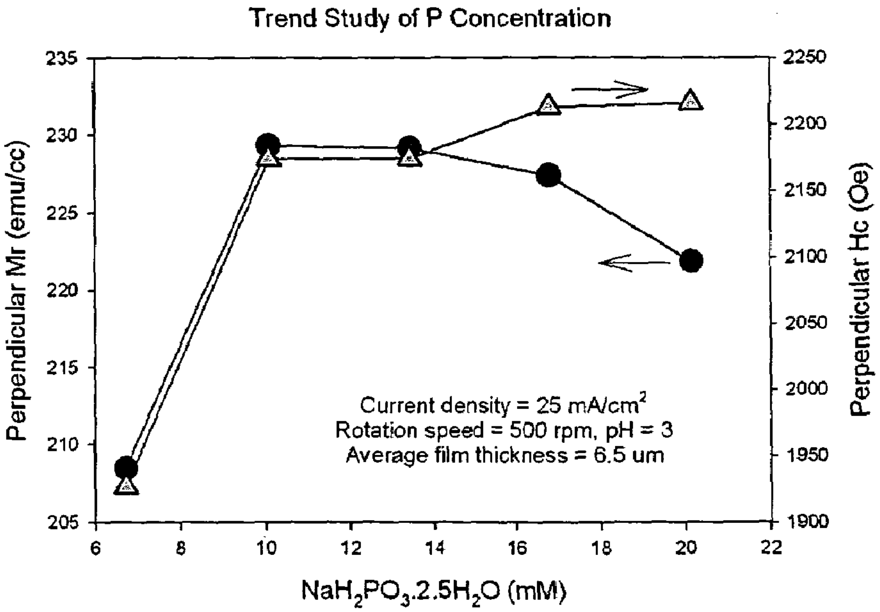
FIG. 4 is a graph showing the effect of P concentration on the vertical magnetic properties of a film.

The effect of P concentration is manifested in FIG. 4 which shows an optimum Mr and Hc at about 17 mM of P in the bath

TABLE 1

Bath composition of electroplating baths.

| Chemicals | Bath Concentration (mM) | | | | |
|---|---|---|---|---|---|
| | CoNiReP | CoNiReP/Mn | CoNiReP/Mo | CoNiReP/W | CoNiReP/Pt |
| Boric Acid | 400 | 400 | 400 | 400 | 400 |
| Sodium Chloride | 400 | 400 | 400 | 400 | 400 |
| Cobalt (II) Chloride Hexahydrate | 25-100 | 25-100 | 25-100 | 25-100 | 25-100 |
| Nickel (II) Chloride Hexahydrate | 25-100 | 25-100 | 25-100 | 25-100 | 25-100 |
| Ammonium Perrhenate | 4-12 | 4-12 | 4-12 | 4-12 | 4-12 |
| Manganese (II) Sulfate Pentahydrate | — | 1-3 | — | — | — |
| Disodium Molybdate (VI) Dihydrate | — | — | 1-3 | — | — |
| Sodium Tungstate (VI) Dihydrate | — | — | — | 1-3 | — |
| Potassium Hexachloroplatinate (IV) | — | — | — | — | 1-3 |
| Sodium Hydrogenphosphite 2.5 water | 7-20 | 7-20 | 7-20 | 7-20 | 7-20 |
| Dodecyl Sulfate (Sodium Salt) | 0.035 | 0.035 | 0.035 | 0.035 | 0.035 |
| Saccharin (Sodium based) | 4 | 4 | 4 | 4 | 4 |

solution. This is achieved by keeping Co, Ni and Re at the optimized concentration as derived from the earlier experiments. Hence an overall optimized bath composition or solution for the Co—Ni—Re—P system is known.

Figure 5:
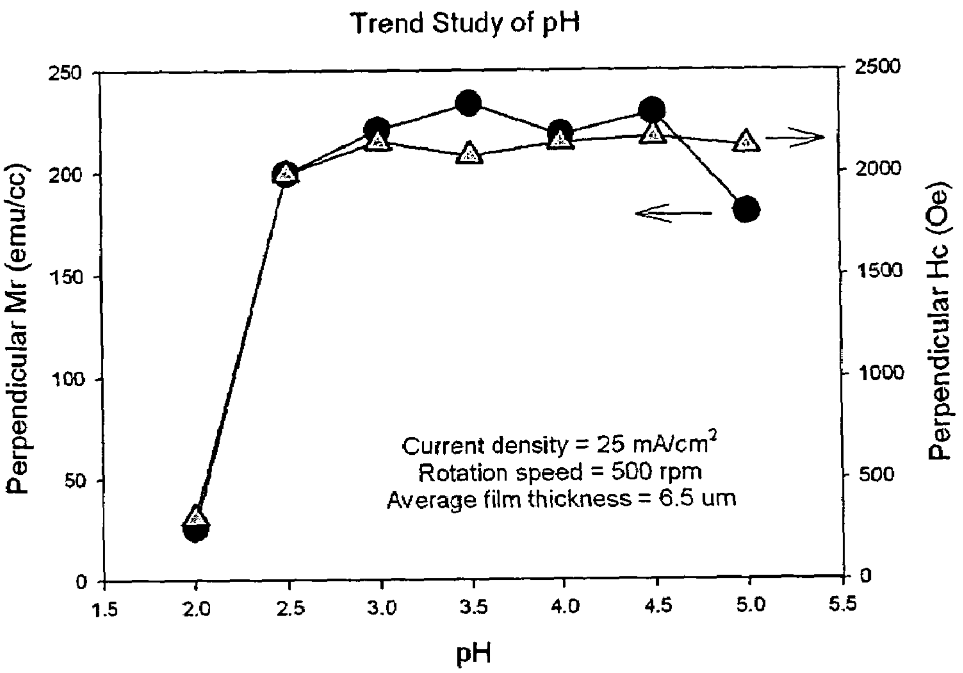
FIG. 5 is a graph showing the effect of solution pH on the vertical magnetic properties of a film.
Figure 6:
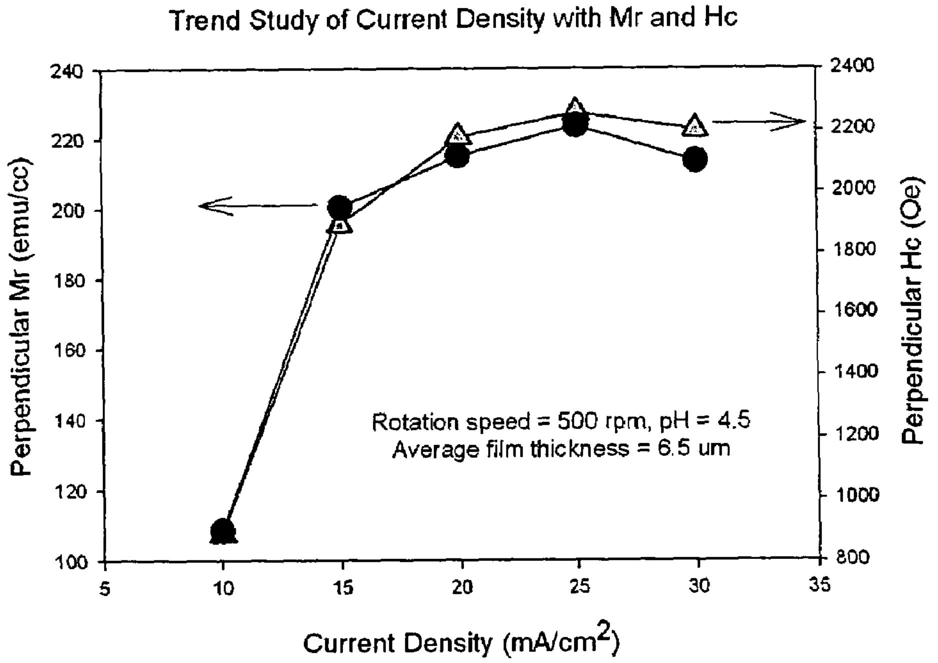
FIG. 6 is a graph showing the effect of current density on the vertical magnetic properties of a film.

FIGS. 5 and 6 are graphs showing optimization results of plating conditions utilizing the above described optimized bath solution. As shown in FIG. 5, vertical Mr and Hc are rather constant within a pH range of 2.5 to 4.5. The effect of current density relates to the rate of deposition on the substrates. Higher current density leads to faster deposition and vice versa. In order to isolate the effect of current density, plating duration was adjusted with different current density in trying to achieve the same film thickness at about 6.5 um since magnetic properties could be affected by thickness as well. The results are shown in FIG. 6. Both vertical Mr and Hc increase with increasing current density from 10 $mA/cm^2$ to about 20 $mA/cm^2$ after which there is not much change upon further increase in current density. As a matter of fact, higher current density at about 30 $mA/cm^2$ resulted in high film stress causing slight peeling of film. Finally all optimized plating solutions and conditions are presented in Table 2.

TABLE 2

Optimized plating conditions for Co—Ni—Re—P system

| Parameters | Conditions |
|---|---|
| Ni to Co mole ratio | 1.0 |
| Total concentration of Ni and Co | 0.1 M |
| Concentration of Re | 0.008 M |
| Concentration of P | 0.017 M |
| Current Density | 25 $mA/cm^2$ |
| Bath solution pH | 4.5 |

Figure 7:
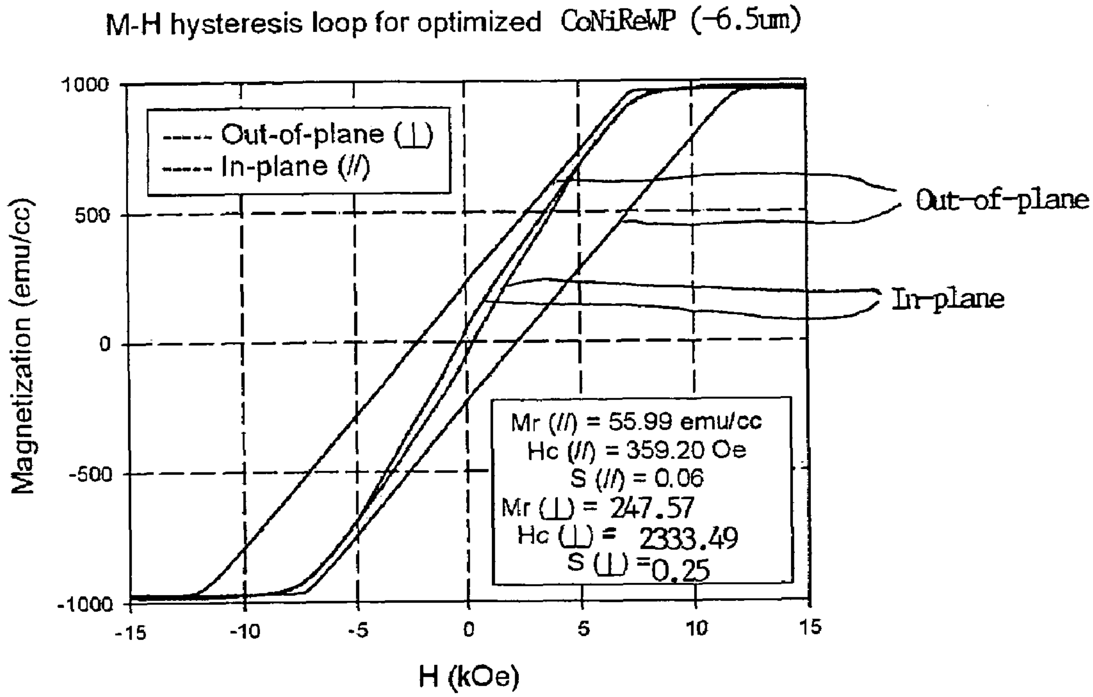
FIG. 7 is a graph showing the hysteresis loop of the magnetization of an optimised Co—Ni—Re—W—P film versus applied magnetic field.
Figure 8:
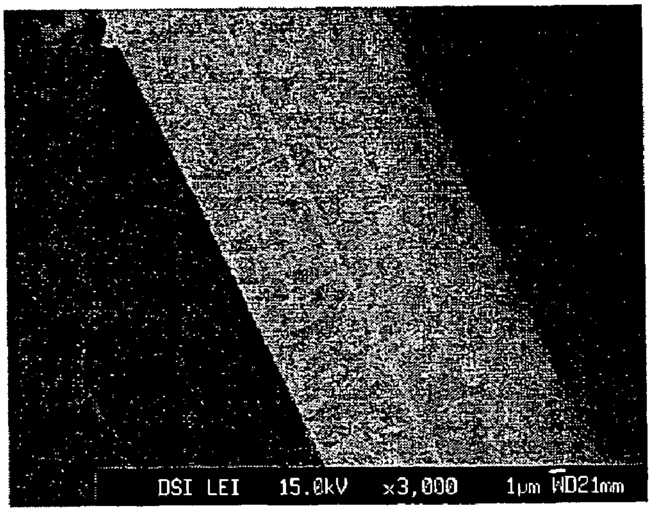
FIG. 8 illustrates a microstructure view of the cross section of the film of FIG. 7.

M-H hysteresis loop of optimized CoNiReP as measured by VSM is shown in FIG. 7. It is evident that the sample shows a very much stronger hard-axis (vertical) anisotropy over the easy-axis (parallel) anisotropy. This observation corresponds to columnar grain microstructure as observed from the scanning electron microscopy (SEM) picture of the cross-section of the film in FIG. 8. Composition analysis by Inductively-Coupled Plasma (ICP)—Atomic Emission Spectroscopy (AES) shows the following material composition for the optimized film: ~73.8 wt % Co, ~9.7 wt % Ni, ~15.4 wt % Re and ~1.1 wt % P.

After process optimisation of the Co—Ni—Re—P system, doping effects of Mn, Mo, Pt and W is investigated.

Figure 9:
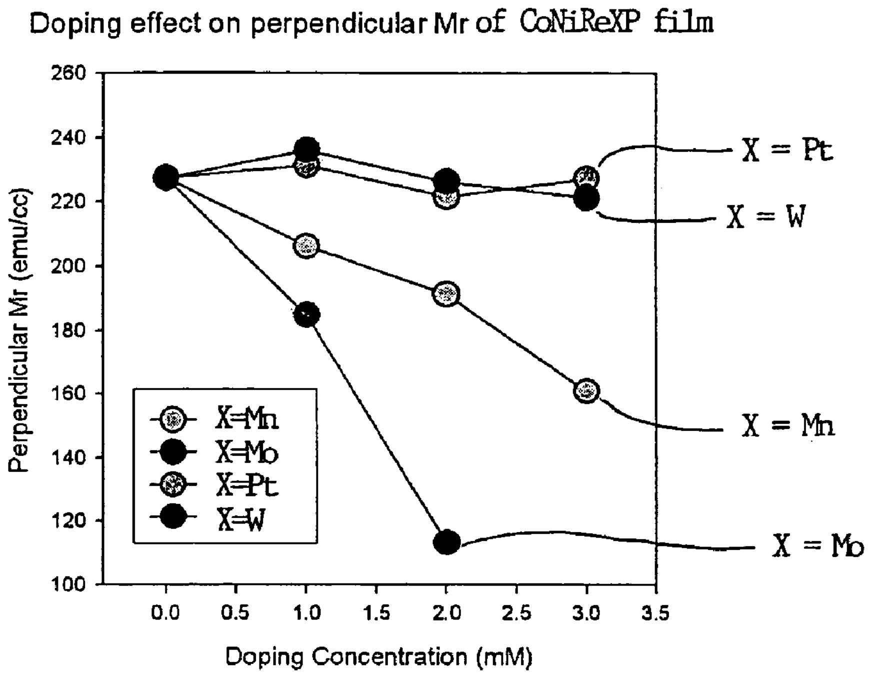
FIG. 9 is a graph showing the effect of doping concentration on the vertical remnant magnetisation of a film.
Figure 10:
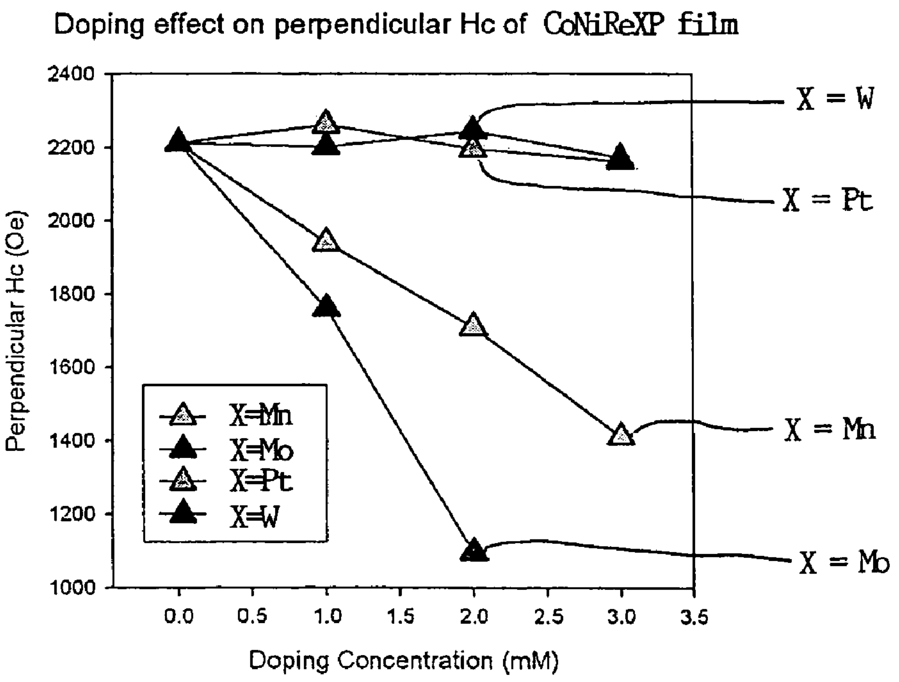
FIG. 10 is a graph showing the effect of doping concentration on the vertical coercivity of a film.

FIGS. 9 and 10 show the effect of doping CoNiReP with Mn, Mo, Pt and W under optimized bath and plating conditions as given in Table 2. A drastic drop in both vertical Mr and Hc of CoNiReP is observed upon doping with trace amount of Mn and Mo, while performance is either slightly enhanced or maintained with trace amount of Pt and W. Table 3 below shows the VSM measurement results of vertical Mr and Hc for different samples of CoNiReP doped with Pt and W with an average film thickness of ~6.5 um.

Figure 11:
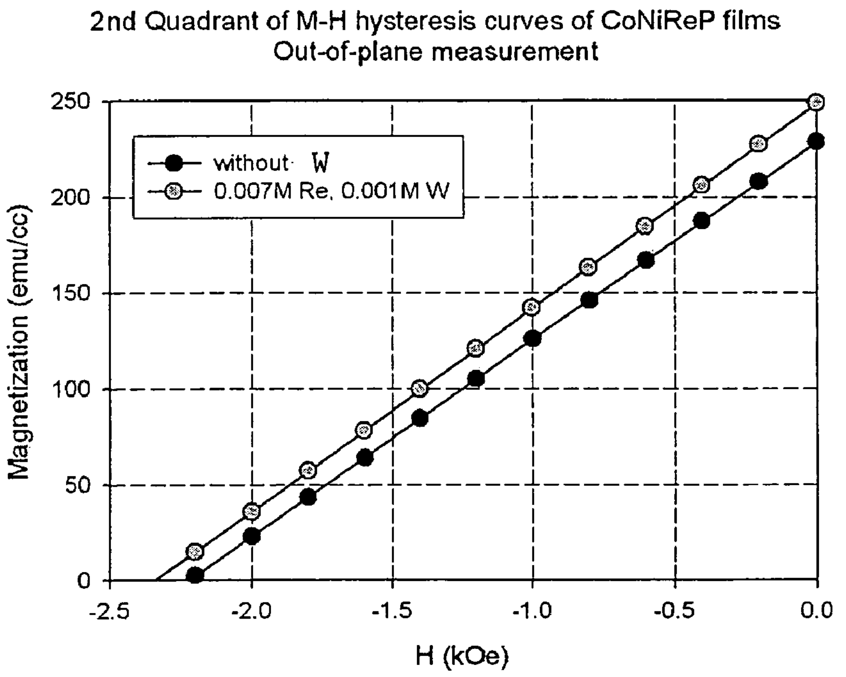
FIG. 11 is a graph showing the $2^{nd}$ quadrant of the hysteresis loop of the magnetisation of optimised Co—Ni—Re—P and Co—Ni—Re—W—P films versus applied magnetic field.

FIG. 11 shows the second quadrant of the M-H hysteresis loops of CoNiReP with and without W doping. By fine adjustment of Re and W concentration in the bath solution, an improved vertical magnetic performance has been achieved at 0.007M Re and 0.001M W. The optimized Co—Ni—Re—W—P film has the following composition: ~70.6 wt % Co, ~9.4 wt % Ni, ~12.2 wt % Re, ~6.7 wt % W and ~1.1 wt % P.

TABLE 3

Vertical magnetic properties of CoNiReP without doping and with Pt and W doping plated under the optimized conditions given in Table 2.

| Concentration (mM) | | | Vertical Mr | Vertical Hc | |
|---|---|---|---|---|---|
| Re | Pt | W | (emu/cc) | (Oe) | Squareness S |
| 8 | 0 | 0 | 227.40 | 2212.87 | 0.23 |
| 8 | 1 | 0 | 231.43 | 2262.77 | 0.24 |
| 8 | 2 | 0 | 221.58 | 2196.29 | 0.23 |
| 8 | 3 | 0 | 227.22 | 2163.52 | 0.23 |
| 8 | 0 | 1 | 236.06 | 2203.95 | 0.24 |
| 8 | 0 | 2 | 226.29 | 2245.68 | 0.24 |
| 8 | 0 | 3 | 221.20 | 2172.50 | 0.24 |
| 7 | 0 | 1 | 247.57 | 2333.49 | 0.25 |
| 7 | 0 | 2 | 221.90 | 2100.59 | 0.23 |
| 6 | 0 | 1 | 237.74 | 2316.34 | 0.24 |
| 6 | 0 | 3 | 243.75 | 2334.67 | 0.25 |

Figure 12:
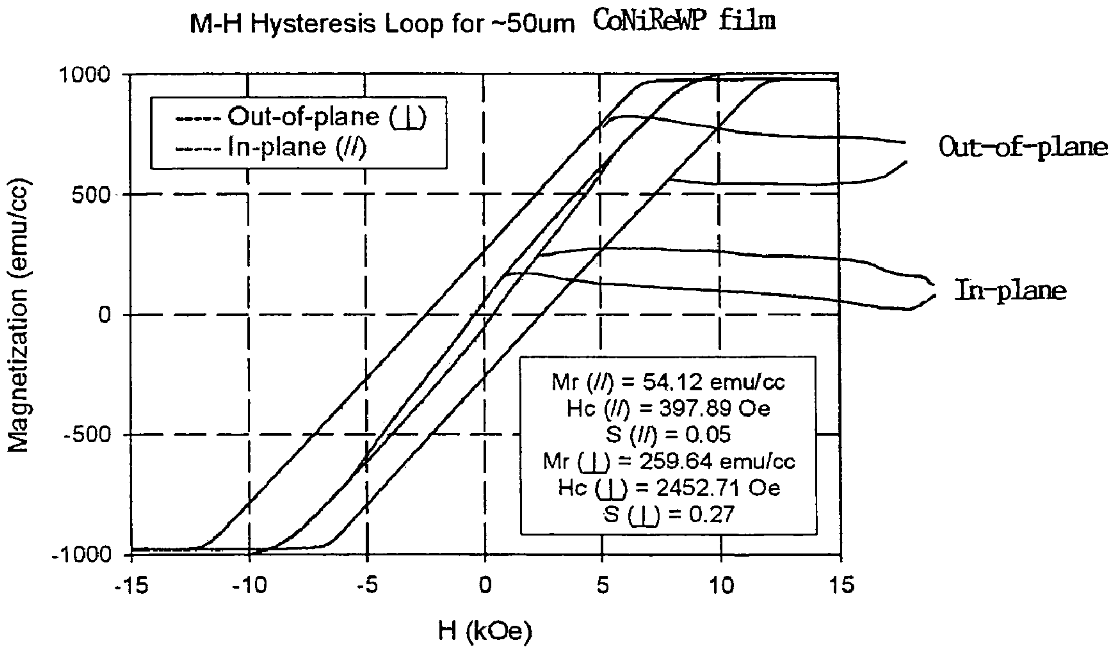
FIG. 12 is a graph showing the hysteresis loop of the magnetisation of a film of about 50 μm thickness versus applied magnetic field.

As shown in FIG. 12, high vertical anisotropy of film is maintained upon increasing thickness to about 50 μm. The film is plated under the same optimized condition except with an increased saccharin content of 25 mM so as to alleviate high film stress for thick film. Thus, such film is applicable for many MEMS devices that make use of thick magnetic film for electromagnetic actuation.

A first such device is shown in FIGS. 13 and 14 depicting respectively top and side views of a micro-actuator 100 functioning as a microshutter. The micro-actuator 100 includes a substrate 1 which includes a coil 2 and a pin-hole 3 through which light signal is able to pass through. A pedestal 4 upstanding from the substrate 1 supports an elongate strip 5 which extends straight and horizontal from the pedestal 4 along the length direction of the substrate 1. The strip 5 is connected to the pedestal 3 via a flexible structure 6 acting like a spring. The strip 5 has an aperture 7 near to the end of the strip to allow the passing of light beam 8. The strip 5 includes on its bottom surface facing the substrate 1 an array of magnetic elements 9 formed of a composition according to the present invention.

Application of a current to the coil 2 causes the coil 2 to interact with a permanent magnetic field generated by the magnetic elements 9, and causes in-plane motion to the strip 5, and in this embodiment, the strip 5 is caused to move horizontally shown by the arrow X. When the aperture 7 on the strip is aligned with the pin-hole 3 on the substrate 1, light passes through the device 100 and vice versa. The micro-shutter may be used as an optical switch or spatial light modulator.

Another application example is shown in FIG. 15, the details of which are described in application SG200304380-9 and the contents of which are incorporated herein by reference. Two substrates 10 and 20 with etched holes 12,22 on the surfaces are used to sandwich separate shafts 30 with each shaft 30 received in corresponding etched holes 12,22. One side of the substrate is subsequently etched to produce circular trenches 40 forming a rotor. These trenches 40 are filled by magnetic elements 50 formed of a composition and by a method according to the present invention. Another substrate 60 having an array of stator 70 and coil 80 is bonded to the sandwiched substrates 10, 20 forming a complete assembly of motors. Individual micromotors 90*a*, 90*b*, 90*c* are obtained by cutting circularly through the whole assembly. The elements 50 are arranged as a ring of permanent magnets, having multiple alternating north poles (N) and south poles (S). When external current is passed through the coils 80, magnetic torque will be generated in a direction in and out of the plane of the drawing to generate rotational motion to turn each individual micromotor 90*a*, 90*b*, 90*c*.

Having fully described the present invention, it can be appreciated that the proposed magnetic material based on Co—Ni—Re—P—W or Co—Ni—Re—P—Pt is an attractive candidate for many integrated micro-devices, since it would provide potentially high vertical magnetic performance and ease of property control by process parameters. Further, its application can be easily extended to patterned electrodeposition and hence it offers great advanatages over post-deposition etching of films especially when small structure with vertical sidewall and high aspect ratio are essential.

The described embodiments and experiments should not be construed as limitative. For example, although the experiments describe conducting the electrochemical deposition at about 20° C., other temperatures are also envisaged, but preferably below 30° C. Also, although the described embodiment describes the magnetic material having a suitable proportion (wt %) of either W or Pt, it is envisaged that the magnetic material can include a combination of these materials with suitable wt % of each material.

Further, the embodiments describe a micro-shutter and micro-motors as application examples, but it would be apparent that the present invention is also useful to be included in other micro-devices such as sensors, frictionless micro-gears etc.

REFERENCES

1. M. Becker, D. L. Notarp, J. Vogel, E. Kieselstein, J. P. Sommer, K. Bramer, V. GroBer, W. Benecke, B. Michel, Microsystem Technologies, 7, 196-202, 2001.
2. H. J. Cho, C. H. Ahn, Journal of Microelectromechanical Systems, 11, 1, 78-84, 2002.
3. J. P. Park, M. G. Allen, J. Micromech. Microeng, 8, 307-316, 1998.
4. F. E. Luborsky, IEEE Transactions on Magnetics, 6, 3, 502-506, 1970.
5. N. V. Myung, D. Y. Park, M. Schwartz, K. Nobe, H. Yang, C. K. Yang, J. W. Judy, 6$^{th}$ International Symposium on Magnetic Materials, Processes and Devices, Proc. Electrochem. Soc., PV2000-29, 2000.
6. T. S. Chin, Journal of Magnetism and Magnetic Materials, Vol. 209, p. 75-79, 2000.
7. T. Osaka, Electrochimica Acta, 45, 3311-3321, 2000.
8. K. Nobe, M. Schwartz, L. Chen, N. S. Myung, U.S. Patent, US006306276B1, 2001.
9. D. Y. Park, N. Y. Myung, M. Schwartz, K. Nobe, Electrochimica Acta, 47, 2893-2900, 2002.
10. J. Horkans, D. J. Seagle, I. C. H. Chang, J. Electrochem, Soc., 137, 7, 2056-2061, 1990.
11. S. Franz, M. Bestetti, M. Consonni, P. L. Cavallotti, Microelectronic Engineering, 64, 487-494, 2002.
12. P. L. Cavallotti, N. Fauser, A. Zielonka, J. P. Celis, G. Wouters, J. M. Da Silva, J. M. B. Oliveira, M. A. Sa, Surface and Coatings Technology, 105, 232-239, 1998.
13. I. Zana, G. Zangari, IEEE Transactions on Magnetics, 38, 5, 2544-2546, 2002.
14. T. M. Liakopoulos, W. Zhang, C. H. Ahn, IEEE Transactions on Magnetics, 32, 5, 1996.

The invention claimed is:

1. A layer of magnetic material which has vertical magnetic properties, comprising:

50-80 wt % of Cobalt, 9-15 wt % of Nickel, 10-25 wt % of Rhenium, 0.1 to 2.0 wt % of Phosphorus, and 5-10 wt % of Platinum.

2. A structure including a substrate and layer of magnetic material according to claim 1 on the substrate, the layer having a thickness of at least 1 μm.

3. The MEMS device including a layer of the magnetic material according to claim 1.

4. The MEMS device according to claim 3, wherein the magnetic material is provided on a movable member supported by a connecting structure, the member being arranged to be moved with respect to the connecting structure.

5. The MEMS device according to claim 3, wherein the magnetic material is provided in a rotational element.

* * * * *